Patented July 27, 1937

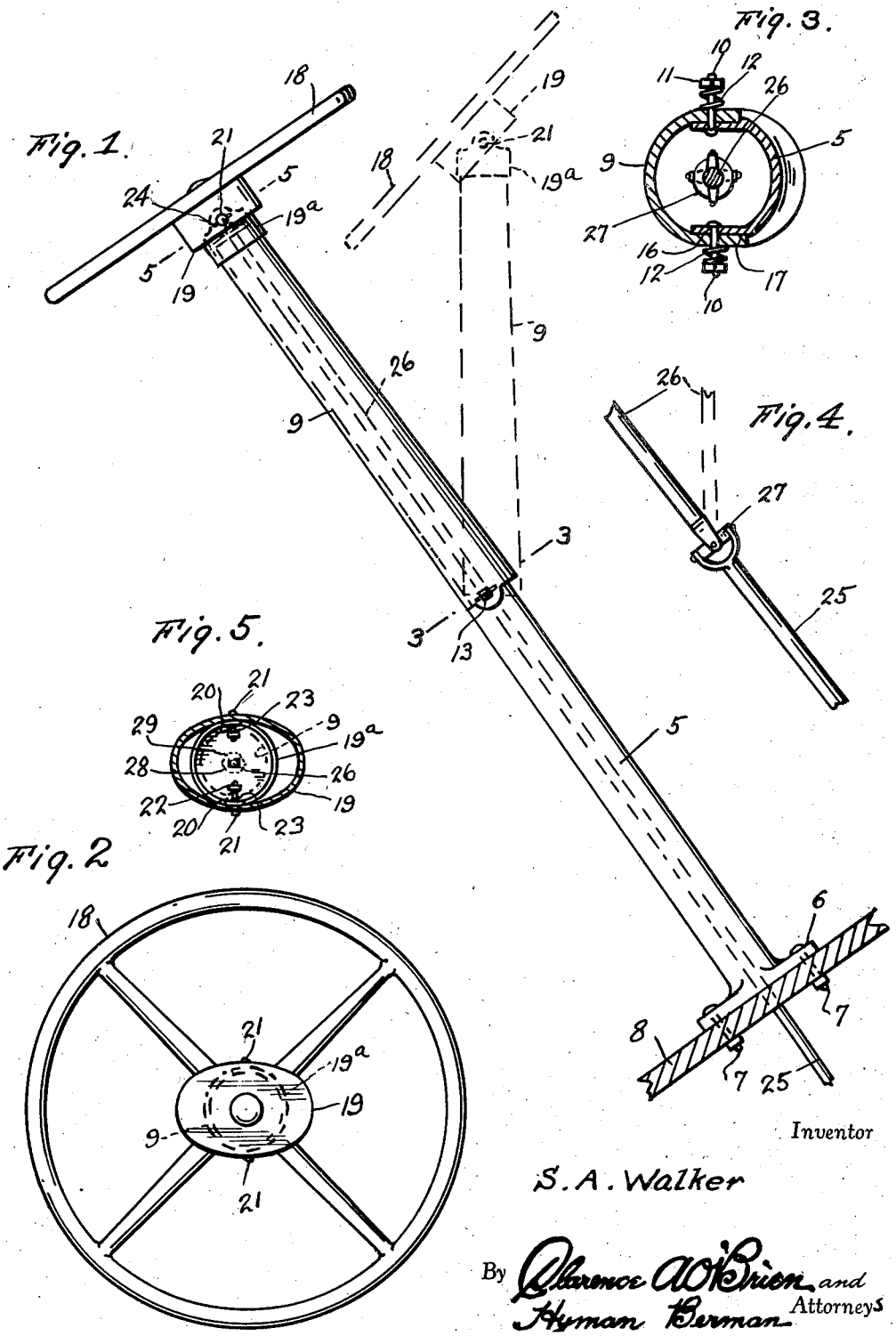

2,088,146

UNITED STATES PATENT OFFICE 2,088,146

STEERING POST AND WHEEL ASSEMBLY

Stephen A. Walker, Lancaster, Ky.

Application February 24, 1936, Serial No. 65,494

4 Claims. (Cl. 74—492)

This invention relates to a steering post, rod and wheel assembly particularly designed for use as a part of the steering apparatus of automobiles.

An object of the present invention is to provide an assembly of the character mentioned which will prove an effective safeguard, in the event of an accident, to prevent injury to the operator of the vehicle.

In accordance with the present invention a steering post and rod are provided and so constructed as to permit the post and rod to substantially fold in the event the vehicle should run head on into another vehicle or other object.

Further in accordance with the present invention the steering wheel is so mounted on the post as to fold relative thereto under such eventualities as above referred.

The invention together with its objects and advantages will be best understood from a study of the following description taken in connection with the accompanying drawing wherein:

Figure 1 is a side elevational view of a steering post embodying the features of the present invention the folded position of the upper section of the steering post and the steering wheel being indicated by broken lines.

Figure 2 is a top plan view of the steering post and wheel.

Figures 3 and 5 are detail sectional views taken substantially on the lines 3—3 and 5—5 respectively of Figure 1.

Figure 4 is a fragmentary detail elevational view of a flexible steering rod.

Referring to the drawing by reference numerals it will be seen that the steering post comprises a substantially tubular section 5 formed with a base flange 6 through the medium of which and fastening elements 7 said post is secured to the dash or footboard 8 of the automobile. Further the post includes an elongated tubular, slightly tapered section 9, and at the widest end of the post section 9 the same is pivotally connected with the upper end of the post section 5 through the medium of pivot bolts 10 equipped with nuts 11 and springs 12.

At opposite sides thereof and at the pivoted end thereof the post section 9 is provided with ears 13 that are apertured to receive the pins 10 that extend outwardly from opposite sides of the post section 5.

At the end thereof pivoted to the section 9 post section 5 is suitably provided to accommodate the ears 13.

At the ear equipped end thereof section 9 is also provided with grooves 16 which receive locking ribs 17 on the post section 5 for releasably holding the sections 5 and 9 in the extended alined position shown.

The steering wheel is indicated by the reference numeral 18 and includes a hub section 19 which receives the upper end of a tubular hub section 19a sleeved on the upper end of the post section 9 and hub section 19 at diametrically opposite sides thereof is pivoted to ears 20 on the upper end of the hub section 19a through the medium of bolts 21 equipped with nuts 22 and springs 23 which latter offer resistance to a too free swinging movement of the wheel 18 to a folded position relative to the steering post section 9.

Also the opposite side portions of the steering wheel hub section 19 and the ears 20 of the hub section 19a are complementarily grooved and tongued as indicated generally at 24 for releasably securing the steering wheel in proper operative position relative to the post section 9.

The steering post is adapted to accommodate a flexible steering rod the sections 25 and 26 of which are respectively housed within the sections 5 and 9 respectively of the steering post. The steering rod sections 25 and 26 are connected at one end thereof through the medium of a universal joint 27 as shown in Figure 4. At its upper end the steering rod section 26 has a squared end which fits within a squared opening provided in a plate secured with hub section 19a and indicated generally at 28 and at said upper end the steering rod section 26 is threaded for receiving a nut 29 through the medium of which the said upper end of the rod section 26 is positively and efficiently secured to the hub section 19a of the wheel 18 to turn with said wheel.

From the above it will be apparent that with the parts in the full line position shown in Figure 1 the steering wheel 18 is manipulated in the usual manner for controlling the steering of the automobile. In the event of a violent impact, it will be apparent that post section 9 will fold in the direction of the windshield and instrument panel of the automobile and substantially to the position suggested by a broken line in Figure 1. At the same time the wheel 18 will fold in a direction reverse to the post section 9 and to the position also suggested by broken lines in Fig. 1. With the folding and collapsing of the post and wheel in the manner indicated it will be apparent that the same will act as a guard to prevent the operator being catapulted through the windshield of the automobile.

Also the construction illustrated and described permits of a convenient folding of the post 9 relative to the post section 5 and the wheel 18 relative to the post section 9 so as to place these parts in an out of the way position thus making it more convenient for the operator in assuming his position behind the steering wheel or in vacating said position.

Having thus described the invention, what is claimed as new is:

1. A folding steering post for automobile comprising a relatively fixed section provided at one end for attachment to the dashboard of an automobile, a second section foldable relative to the first section, bolts pivotally connecting the first and second sections together at one end, springs disposed about said bolts for urging opposite sides of the second section into frictional engagement with the adjacent sides of the first section, inter-engaging means on the first and second sections at the pivoted ends thereof for releasably securing said sections in substantial alinement, a steering wheel provided with a hub section mounted on the free end of the second post section to rotate about the latter as an axis, and a second hub section, bolt means pivotally connecting opposite sides of the second hub section of the steering wheel with opposite sides of the first mentioned hub section, and springs engaged with the last named bolts and urging opposite sides of the first named hub section into frictional engagement with adjacent sides of the second hub section of the steering wheel, and inter-engaging means on the hub sections of the steering wheel for releasably securing the steering wheel in a fixed position relative to the first named hub section.

2. A folding steering post for automobile comprising a relative fixed section provided at one end for attachment to the dashboard of an automobile, a second section foldable relative to the first section, bolts pivotally connecting the first and second sections together at one end, springs disposed about said bolts for urging opposite sides of the second section into frictional engagement with the adjacent sides of the first section, interengaging means on the first and second sections at the pivoted ends thereof for releasably securing said sections in substantial alinement, a steering wheel provided with a hub section rotatably mounted on the free end of the second post section, and a second hub section pivotally connected at opposite sides thereof with opposite sides of the first marked hub section, springs urging opposite sides of the first named hub section into frictional engagement with adjacent sides of the second hub section of the steering wheel, inter-engaging means on the hub sections of the steering wheel for releasably securing the steering wheel in a fixed position relative to the first named hub section, and a flexible steering rod extending through the post sections and connected at one end with the first hub section of the steering wheel.

3. In a steering mechanism for automobiles, the combination of a folding steering post, provided at one end for attachment to the dashboard of an automobile, a steering wheel hub section mounted on the relatively opposite end of the steering post to rotate about the latter as an axis, a second hub section pivotally connected with the first mentioned hub section of the steering wheel, spring devices forming part of the pivotal connection between the hub sections and cooperating with said hub sections for releasably securing the hub section against rotation relative to one another, and said second hub section having spokes extending outwardly therefrom, and a rim secured to the outer ends of the spokes.

4. In a steering mechanism for automobiles, the combination of a folding steering post, provided at one end for attachment to the dashboard of an automobile, a steering wheel hub section mounted on the relatively opposite end of the steering post to rotate about the latter as an axis, a second hub section pivotally connected with the first mentioned hub section of the steering wheel, spring devices forming part of the pivotal connection between the hub sections and cooperating with said hub sections for releasably securing the hub sections against rotation relative to one another, and said second hub section having spokes extending outwardly therefrom, a rim secured to the outer ends of the spokes, and interengaging means on the hub sections of the steering wheel coacting in response to the action of said spring devices for releasably securing the steering wheel in an operative position relative to the steering post.

STEPHEN A. WALKER.